United States Patent Office 3,435,592
Patented Apr. 1, 1969

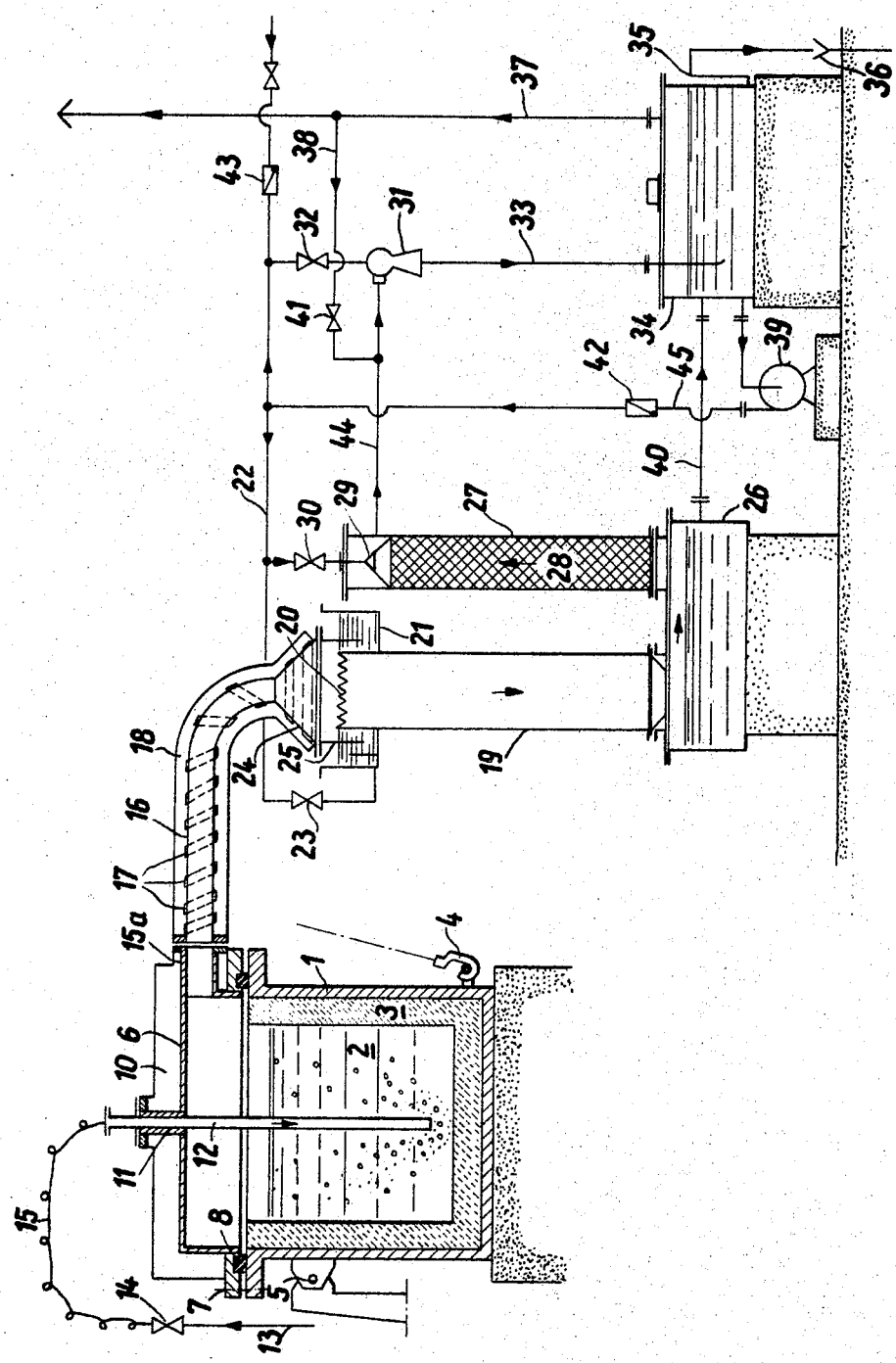

3,435,592
PROCESS AND APPARATUS FOR THE PURIFICATION OF THE GASES GENERATED IN THE CHLORINATING TREATMENT OF ALUMINOUS MELTS
Ernst E. Lindenmaier, Kusnacht, Zurich, and Edgar Jackel and Ludwig G. Mathys, Zurich, Switzerland, assignors to Krebs & Co. Ltd., Zurich, Switzerland
Filed July 28, 1966, Ser. No. 568,584
Int. Cl. B01d 57/00, 47/02
U.S. Cl. 55—71    3 Claims

ABSTRACT OF THE DISCLOSURE

The waste gas from a chlorine-treated aluminum melt is passed with a temperature above the sublimation temperature of the gaseous aluminum chloride contained therein into a falling film condenser in which walls completely covered with a film of a cooling liquid which dissolves condensed aluminum chloride, enclose the waste gas stream.

---

This invention relates to purifying the waste gases which are formed in the removal of hydrogen from aluminous melts by introduction of chlorine, and is concerned with a process and apparatus for accomplishing this purpose.

It is well known that molten pure aluminum has the capacity to hold great amounts of hydrogen. Said hydrogen is partly dissolved in the melt as atomic hydrogen, partly it is chemically bound as aluminum hydride. On solidification of the cast melt, the dissolved atomic hydrogen changes into the molecular state and causes obnoxious bubbles in the casting.

In order to remove the hydrogen, the melt is chlorinated by introduction of dry chlorine or carbon chloride compounds, whereby the hydrogen is converted to hydrogen chloride. Thereby, a large stoichiometric excess of chlorine gas must be applied to produce a thorough intermixture of the melt with the chlorine and substantial removal of the hydrogen. With the aluminum of the melt, said excess chlorinating gas forms aluminum chloride which at atmospheric pressure sublimes at about 180° C. from the solid state into the gaseous state.

In said purification process, the reaction products leaving the melt at a temperature of about 700° C. consist essentially of gaseous aluminum chloride and a small proportion of gaseous hydrogen chloride. If said chlorination waste gases are allowed to escape into the atmosphere, dense white fumes are formed when they are cooled below the sublimation temperature of the aluminum chloride. Said fumes consist of very fine solid aluminum chloride particles, and chemically aggressive hydrochloric acid formed on contact with the moisture of the air due to the presence of hydrogen chloride gas. Therefore, said waste gases must be purified before they enter the atmosphere.

To overcome said deficiency, a purification method has become known where a hood is placed above the crucible. The chlorination gases leaving the melt are mixed between crucible and hood with air, drawn off and passed into a separation station. As a relatively large amount of cold carrier air, compared with the amount of chlorination gas, is sucked in, the temperature of the gas mixture falls below the sublimation temperature of the aluminum chloride; thereby, the aluminum chloride precipitates in the form of very fine particles having a diameter essentially below $\frac{1}{1000}$ mm. The removal of said aluminum chloride particles from the gas current is very difficult and requires costly apparatus. Cyclones, wash or spray towers or mechanical washing devices do not give satisfactory results. Only electrofilters, which are expensive and require considerable space, provide a sufficient separation degree. For this reason, the known separators generally comprise a wash tower in which the coarser aluminum chloride particles and the hydrogen chloride gas are washed out, and a subsequent wet electrofilter for the removal of the fine aluminum chloride particles. Such purification methods are expensive and require much space because they must use costly electrofilters and treat large quantities of gases, due to the carrier air employed.

One of the objects of this invention is to provide a process and apparatus which eliminates the drawback of the known procedure that the originally gaseous aluminum chloride is precipitated as very fine particles whose removal is difficult.

Another object of the invention is to provide a simple apparatus for the removal of the chlorination reaction products, particularly the aluminum chloride, from an aluminous melt.

Other objects and advantages will become apparent from a consideration of the specification and claims.

According to the invention, the waste gas of the chlorinating treatment of aluminous melts, which waste gas has still a temperature above the sublimation temperature of the aluminum chloride contained therein, is contacted with a liquid surface which has a temperature below said sublimation temperature. Thereby, the aluminum chloride condenses on said liquid surface, is absorbed by the liquid, and can be removed therewith.

Our new method allows of absorbing substantially the entire aluminum chloride condensed at the liquid surface immediately after it has passed into the solid phase; in contrast to the known condensation devices for aluminum chloride, our method prevents the formation of solid accretions which would have to be removed periodically. The formation of such solid accretions has the additional drawback that with increasing thickness of the adhering chloride layer the condensation effect of the separator device decreases because said layer has a low heat conductivity and hinders the heat transfer. In contrast thereto, a condensation of the aluminum chloride on a liquid surface prevents the condensation products to form accretions because they are absorbed by the liquid immediately after they are formed, and are continuously discharged together with the liquid. In this way, the condensation efficiency remains uniform, and, in addition, also part of the hydrogen chloride gas contained in the waste gas current is removed by absorption in the liquid. A preferred liquid is water but weakly alkaline aqueous solutions which are good absorbers for aluminum chloride and hydrogen chloride can also be used. There is no risk of any substantial evaporation of the absorption liquid on contact with the waste gases because the heat content of said gases is relatively small and because the heating of the liquid can be limited to a predetermined degree by adjusting the liquid feed per unit of time accordingly.

As stated hereinabove, also a part of the hydrogen chloride contained in the waste gases is removed when the waste gas contacts the liquid surface. However, said removal is very incomplete as the contact surfaces are not large enough and as the gas velocities are rather low. Neither are there removed solidifying particles entrained with the gas current from the melt. In order to purify the waste gas also from said reaction products, it is, after having contacted the liquid surfaces, washed to remove the hydrogen chloride still contained therein and the entrained particles from the melt. Hereby, the residual hydrogen chloride gas is absorbed, and the solid particles are removed.

In commercial operation, it cannot always be avoided that part of the gaseous chlorine to be introduced into the melt passes directly into the waste gas, for instance by corrosion of the chlorine admission pipe in the space above the melt. If, e.g., water is used as condensation and wash liquid, the amount used for the removal of the aluminum chloride and the washing of the gas is not sufficient to absorb the chlorine gas, due to its relatively low solubility in water. The invention overcomes this difficulty by mixing, after removal of the aluminum chloride and washing out of the hydrogen chlorides, the waste gas thoroughly with an amount of liquid corresponding to the low solubility of the chlorine, whereupon said chlorine can be removed together with said liquid.

The apparatus for carrying out the process comprises a gas space above the aluminum melt, which gas space is essentially or completely sealed against the entry of the atmosphere and provided with a conduit for the waste gas, and it comprises further a separator device for the aluminum chloride. The walls defining said gas space are heat insulated, and the separator device is a falling film condenser for the aluminum chloride consisting of one or more fall tubes which are connected gastight to the waste gas conduit. The inner and/or outer faces of said fall tubes presented to the gas current are covered by a liquid film which extends over the entire tube circumference and drains downwardly by gravity.

Preferably, the gas space above the aluminum melt is substantially enclosed by a hood tightly placed on the crucible.

In contrast to the known procedures, our new apparatus allows of passing the waste gas without any noticeable admixture of atmospheric air into a falling film condenser which offers a large liquid surface and ensures self-purification of the fall tubes, thereby preventing any deposits of solid matter in said fall tubes.

Spray towers for condensing the aluminum chloride are less effective than falling film condensers because the individual drops of the sprayed liquid leave, on their passage through the gas, a zone of undercooled gas in which the aluminum chloride precipitates in form of solid particles.

Neither are packed columns in which the liquid flows over the filling material and which are passed by the waste gases to be purified, as suitable as falling film condensers. The surfaces of the packings present always areas not rinsed by the liquid, and such areas allow the aluminum chloride of forming deposits which clog the column.

In order to prevent deposits of solid aluminum chloride on the walls of the waste gas conduit between the molten aluminous bath and the condenser, it is of advantage to provide said walls in said area with heating means maintaining the temperature of the inner wall of the conduit at all times above the sublimation temperature of the aluminum chloride.

A hermetic seal between the waste gas conduit and the condenser can be readily obtained by providing therebetween a fluid seal where the liquid container, in which the end of the waste gas conduit, or a connecting piece, is immersed, serves simultaneously as supply vessel for the liquid for the fall tubes.

For the removal of the residual reaction products not precipitated in the falling film condenser, the waste gas leaving the falling film condenser is passed through a packed scrubbing column in countercurrent to a washing liquid and then through a liquid jet aspirator which is connected to an exhaust for the purified gas over a collecting and gas separating vessel. In the packed column, the gas is washed and the residual hydrogen chloride as well as the entrained particles of the melt are removed while in the suction jet the chlorine, which may be still present in the waste gas, is dissolved by the thorough mixing with a large amount of liquid and discharged therewith. The liquid jet suction pump acts as conveying means for the waste gas as well as to maintain the reduced pressure in the preceding conduits and parts of the apparatus through which the waste gas flows. The liquid jet suction pump is operated with a large supply of fluid so as to produce a thorough mixing of the waste gas with said operating fluid and to absorb any free chlorine therein. In order to increase the chlorine absorbing effect of the liquid jet aspirator, the gas can be passed repeatedly therethrough. For this purpose, the discharge of the suction jet may be connected with the suction side by a line provided with a control valve to return part of the waste gas to the suction jet. In this way, contact time and contact surface between waste gas and jet operating liquid can be adjusted by manipulation of the control valve.

A better understanding of the invention will be gained by referring to the accompanying drawing which illustrates, by way of example, an apparatus suitable for carrying out the invention.

The drawing shows a crucible provided with an iron shell 1 and an inner lining 3; the crucible contains the aluminous melt 2 to be chlorinated. A draw device (not shown) engages with hook 4 the crucible to tilt it around the pivot 5 for tapping.

A hood for the waste gasses is placed on the crucible. Said hood is detachably secured to the crucible by means of screws 7, with interposition of a seal 8, which may consist of asbestos. During operation, a slight vacuum is maintained in the gas space above the melt 2, whereby the seal 8 prevents entry of atmospheric air into the gas space. This prevents that the chlorination waste gas leaving the melt is mixed with cold air entering between crucible and hool, and is cooled to such an extent that gaseous aluminum chloride precipitates in form of the solid sublimate.

The hood 6 is provided with an outer heat insulation 10 to prevent deposits of solid aluminum chloride on cold areas of the walls. The heat insulation is so dimensioned as to maintain, due to the heat radiation of the aluminous melt, which has a temperature of about 700° C., a wall temperature of the hood above the sublimation temperature of the $AlCl_3$ of about 180° C.

A chlorine distributing pipe 12 is passed through a connecting nipple 11 in the center of the hood 6 and immersed in the aluminous melt 2. The chlorine is supplied to pipe 12 from a pressure vessel through a line 12 and a flexible admission line 13. A valve 14 in line 13 permits metering the amount of chlorine fed into the melt.

At one side, the hood 6 has a flange 15a for connection to a waste gas line 16 which is provided with a heat insulation 18 and serves to draw off the gas to be purified from the gas space. In order to avoid also in said line 16 precipitation of the aluminum chloride on the walls in the form of solid particles and to prevent clogging of the line, it is equipped with electric heating means in form of a heating band 17 spirally wound around the pipe, which is connected, preferably via a thermoswitch (not shown), to an electric voltage source so as to keep the tube 16 always at a temperature above the sublimation temperature of the aluminum chloride.

The waste gas line 16 enters a condenser into which the waste gas is introduced for removal of the aluminum chloride and part of the hydrogen chloride. Said condenser is a falling film condenser and comprises a fall tube 19 whose inner face is entirely covered by a liquid film. For this purpose, the upper end of the fall tube which is provided with intake teeth 20, dips into a liquid distributing cup 21 which receives the liquid, e.g., water, from the supply line 22 equipped with a throttle 23. The distributor cup 21 is open at the top to avoid that the liquid can flow through the waste gas line 16 into the crucible and be evaporated there explosively, when there is any obstruction in the proper drainage of the liquid from the condenser or from the collecting vessel 26.

On tilting the crucible 1, the gas line 16 swings upwardly; therefore, the connection between said line and the condenser must be arranged for ready disconnection. In addition, there should be an immediate transition from the heated wall of the line 16 directly to the unheated film-covered wall of the fall tube 19 because the moist waste gas, if containing chlorine, is extremely corrosive on contact with the unheated walls of the apparatus. For these reasons, the connection of the waste gas tube 16 to the fall tube 19 is provided by a fluid seal where the distributor cup 21 for the liquid forms an immersion vessel for a short cylindrical brim 25, which is detachably secured to the electrically heated and heat insulated conically flaring end 24 of tube 16. The brim 25 encloses the fall tube 19 so as to leave a free slot through which the supplied liquid passes from the distributor cup to the inner wall of the fall tube 19. As the brim is unheated and always in contact with moist waste gas, corrosion is unavoidable. For this reason, the brim is formed as a readily replaced wearing member and is screwed to the conically flaring tube end 24 over a flange connection for easy removal.

Below the fall tube 19, there is a collecting vessel 26 with a connecting flange for said fall tube. Adjacent to said fall tube 19, a washer in form of a packed column 27 is secured to said collecting vessel. The collecting vessel 26 is filled with liquid only to a predetermined level so that the gas leaving the fall tube 19 passes over the surface of the liquid and enters the packed column 27. The gas then passes at a suitably high speed the packing 28 which may consist, for example, of Raschig rings, from the bottom to the top in countercurrent to the down flowing wash liquid, which is supplied from the line 22 through a throttle 30 in adjustable quantities.

The residual hydrogen chloride of the waste gases is substantially absorbed in the liquid of column 27, where, in addition, the solidified melt particles entrained by the chlorinating gas are removed.

From column 27, the gas passes through a connecting line 44 to liquid suction jet 31 which receives the operating liquid in amounts adjustable by the throttle valve 32 from the pressure line 22. At its exit side, the suction jet 31 is connected through a line 33 with a collecting vessel 34, which communicates, through line 40, with vessel 26.

From the collecting vessel 34, the liquid is siphoned at 35 into the canalization 36, while the purified waste gas, which separates in the collecting vessel 34 from the liquid, escapes at 37 into the atmosphere.

In order to increase the chlorine-absorbing effect of the jet pump, it may be overdimensioned with respect to its delivery many times, e.g., tenfold, so that, e.g., 90 percent of the delivered waste gas can be returned from line 37 through the connecting line 38 equipped with throttle valve 41 to the suction side of the jet pump. In this way, the waste gas drawn off from the packed column 27 can be passed about 10 times through the jet aspirator, thereby prolonging accordingly the residence time of the gas in the mixing chamber of the aspirator and producing an increased absorption of the chlorine.

The liquid consumption of the purification plant can be reduced by recycling, by means of pump 39, part of the operating liquid coming from the fall tube 19, the packed column 27, and the jet pump 31, into said units. For this purpose, the pump 39 is at its outlet side connected to the pressure line 22 by means of a connecting line 45 provided with a check valve 42. Said check valve 42 prevents development of a short circuit flow from the pressure line 22 directly through pump 39 into the canalization. In addition, the pressure line 22 contains a further check valve 43 to prevent return of the liquid through the pump 39 into the general pressure system.

We claim:
1. A process for the purification of the hot waste gases formed in the removal of hydrogen by the chlorination of aluminous melt comprising contacting said waste gases at a temperature above the sublimation temperature of the aluminum chloride contained therein with a liquid surface which completely encloses the stream of the wast gases and has a temperature below said sublimation temperatue, to condense said aluminum chloride on said liquid surface and to dissolve the same in said liquid, removing said dissolved aluminum chloride with said liquid, subsequently washing said waste gases freed from aluminum chloride to remove hydrogen chloride still contained in the gases and solid particles entrained from the melt, finally admixing to the waste gases in amount of water sufficient to absorb free chlorine contained in said gases, separating the waste gases from said water containing the absorbed chlorine, and discharging said purified waste gases.

2. An apparatus for the purification of the waste gases which are formed in the removal of hydrogen by the chlorination of an aluminous melt, said apparatus comprising a crucible for an aluminous melt, heat insulated walls defining a gas space above said melt substantially sealed against the atmosphere, a falling film condenser comprising at least one fall tube, means for supplying liquid to said condenser for contacting said waste gases with the falling film of said liquid, a first collection vessel for collecting the falling film of said condenser with the aluminum chloride precipitated therein from said waste gases, a packed column in which the waste gases leaving said first collection vessel are passed in countercurrent to said wash liquid, a liquid jet suction pump receiving the gases from said packed column, a second collecting vessel for separating the liquid and gas delivered by said jet suction pump, an outlet for said gas, and a line connecting said two collecting vessels.

3. The apparatus as claimed in claim 2 comprising a line connecting said outlet and the suction side of said liquid jet pump, and control means in said line, for returning part of the waste gases into said jet pump.

References Cited

UNITED STATES PATENTS

| 2,718,279 | 9/1955 | Kraus | 55—72 |
| 3,073,092 | 1/1963 | Ancrum et al. | 55—71 |
| 3,078,145 | 2/1963 | Gayol | 23—93 |
| 3,152,864 | 11/1964 | Derham | 23—93 |
| 3,257,777 | 6/1966 | Weisse | 55—71 |
| 3,284,992 | 11/1966 | Wikman | 55—71 |

OTHER REFERENCES

Gaylord, et al.: "The Falling-Film Hydrochloride Acid Absorber," Chemical Engineering Progress, March 1957, vol. 53, No. 3, pp. 139m to 144m.

REUBEN FRIEDMAN, *Primary Examiner.*

C. H. HART, *Assistant Examiner.*

U.S. Cl. X.R.

23—93; 55—223